US012583047B2

(12) United States Patent
Romano et al.

(10) Patent No.: US 12,583,047 B2
(45) **Date of Patent: *Mar. 24, 2026**

(54) WELDING SEQUENCE GUIDANCE USING THREE DIMENSIONAL MODELS

(71) Applicant: ILLINOIS TOOL WORKS INC., Glenview, IL (US)

(72) Inventors: Vincent Nicholas Romano, Pinckney, MI (US); Todd Michael McEllis, Jackson, MI (US); Leland Daryl Falde, Jackson, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/823,008

(22) Filed: Sep. 3, 2024

(65) Prior Publication Data

US 2024/0424590 A1     Dec. 26, 2024

Related U.S. Application Data

(63) Continuation of application No. 16/887,010, filed on May 29, 2020, now Pat. No. 12,090,581.

(51) Int. Cl.
B23K 9/095       (2006.01)
G05B 19/4099     (2006.01)

(52) U.S. Cl.
CPC ........ B23K 9/0953 (2013.01); G05B 19/4099 (2013.01); *G05B 2219/45138* (2013.01)

(58) Field of Classification Search
CPC ....... B23K 9/0953; B23K 9/095; G09B 19/24
See application file for complete search history.

(56)               References Cited

U.S. PATENT DOCUMENTS 6,236,017  B1   5/2001   Smartt et al.
8,095,229  B2   1/2012   Muser et al.
9,869,996  B2   1/2018   Patel et al.
9,956,655  B2   5/2018   Yamamoto
                (Continued)

FOREIGN PATENT DOCUMENTS

WO        2010142858       12/2010

OTHER PUBLICATIONS

Proplanner, "3D Virtual Assembly," retrieved from https:www.proplanner.com/solutions/assembly-process-planning/3d-virtual-assembly/ on Apr. 8, 2020, 4 pages.
(Continued)

*Primary Examiner* — Kang Hu
*Assistant Examiner* — Correll T French
(74) *Attorney, Agent, or Firm* — McAndrews, Held & Malloy, Ltd.

(57)               ABSTRACT

Systems and methods are disclosed relating to welding sequence guidance using three-dimensional (3D) models. In some examples, a welding sequence program may use 3D models, rather than two-dimensional (2D) images, to guide operators through welding sequences. Since only one 3D model must be saved for each sequence, rather than potentially hundreds of 2D images, substantial memory space may be saved. Additionally, the same 3D model may be used for several welding sequences. Further, the 3D model may be animated to help the operator understand changes in perspective between steps of the welding sequence.

20 Claims, 7 Drawing Sheets

(56)                    References Cited

U.S. PATENT DOCUMENTS

| | | | |
|---|---|---|---|
| 9,972,215 B2 | 5/2018 | Daniel | |
| 2008/0149686 A1 | 6/2008 | Daniel et al. | |
| 2009/0173726 A1 | 7/2009 | Davidson et al. | |
| 2013/0193123 A1 | 8/2013 | Saint-Martin et al. | |
| 2014/0042136 A1 | 2/2014 | Daniel et al. | |
| 2014/0042137 A1 | 2/2014 | Daniel et al. | |
| 2016/0093233 A1 | 3/2016 | Boulware | |
| 2016/0116911 A1 | 4/2016 | Yamamoto et al. | |
| 2016/0250723 A1* | 9/2016 | Albrecht .............. | B23K 9/0956 |
| | | | 228/9 |
| 2018/0111267 A1 | 4/2018 | Ge et al. | |
| 2019/0084069 A1 | 3/2019 | Daniel et al. | |

OTHER PUBLICATIONS

Canada Patent Office, Office Action, Application No. 3,114,664, dated Aug. 12, 2024, 6 pages.
Canada Patent Office, Office Action, Application No. 3,114,664, dated Jul. 14, 2025, 5 pages.

* cited by examiner

400

214

404

402

214

400

214

400

WELDING SEQUENCE GUIDANCE USING THREE DIMENSIONAL MODELS

CROSS REFERENCE TO RELATED APPLICATIONS

This application is a continuation of, and claims priority to, co-pending U.S. patent application Ser. No. 16/887,010, filed May 29, 2020, entitled "Welding Sequence Guidance Using Three Dimensional Models," the entire contents of which are hereby incorporated by reference.

TECHNICAL FIELD

This disclosure relates to welding sequence guidance, more particularly, welding sequence guidance using three dimensional models.

BACKGROUND

Welding sequences are used to guide welding operators through steps and/or stages of a welding process, such as when assembling a multiple-piece assembly involving multiple welds. The welding sequence may include instructions for an operator to follow to successfully complete the welding process. The guidance is especially valuable for newer, less experienced, operators. However, even experienced operators can benefit from the step by step instructions.

SUMMARY

Welding sequence guidance using three dimensional models is disclosed, substantially as illustrated by and described in connection with at least one of the figures, as set forth more completely in the claims.

These and other advantages, aspects, and/or novel features of the present disclosure, as well as details of an illustrated example thereof, will be more fully understood from the following description and drawings.

DRAWINGS

Features, aspects, and/or advantages of the present disclosure will become better understood when the following detailed description is read with reference to the accompanying drawings in which like characters represent like parts throughout the drawings, wherein.

Figure 3A:
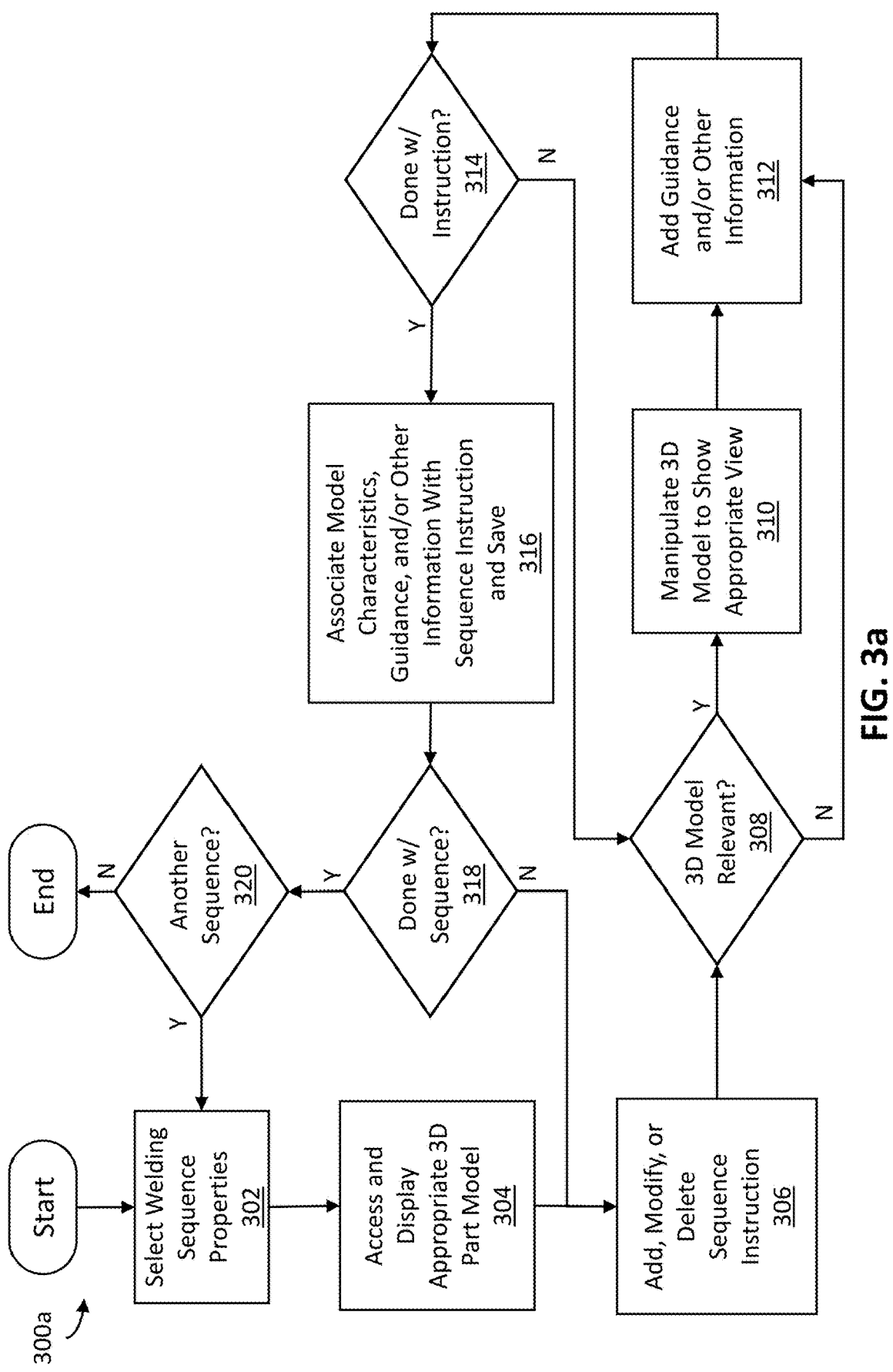

FIG. 3*a* is a flow diagram showing an example welding sequence setup program, in accordance with aspects of this disclosure.

Figure 3B:
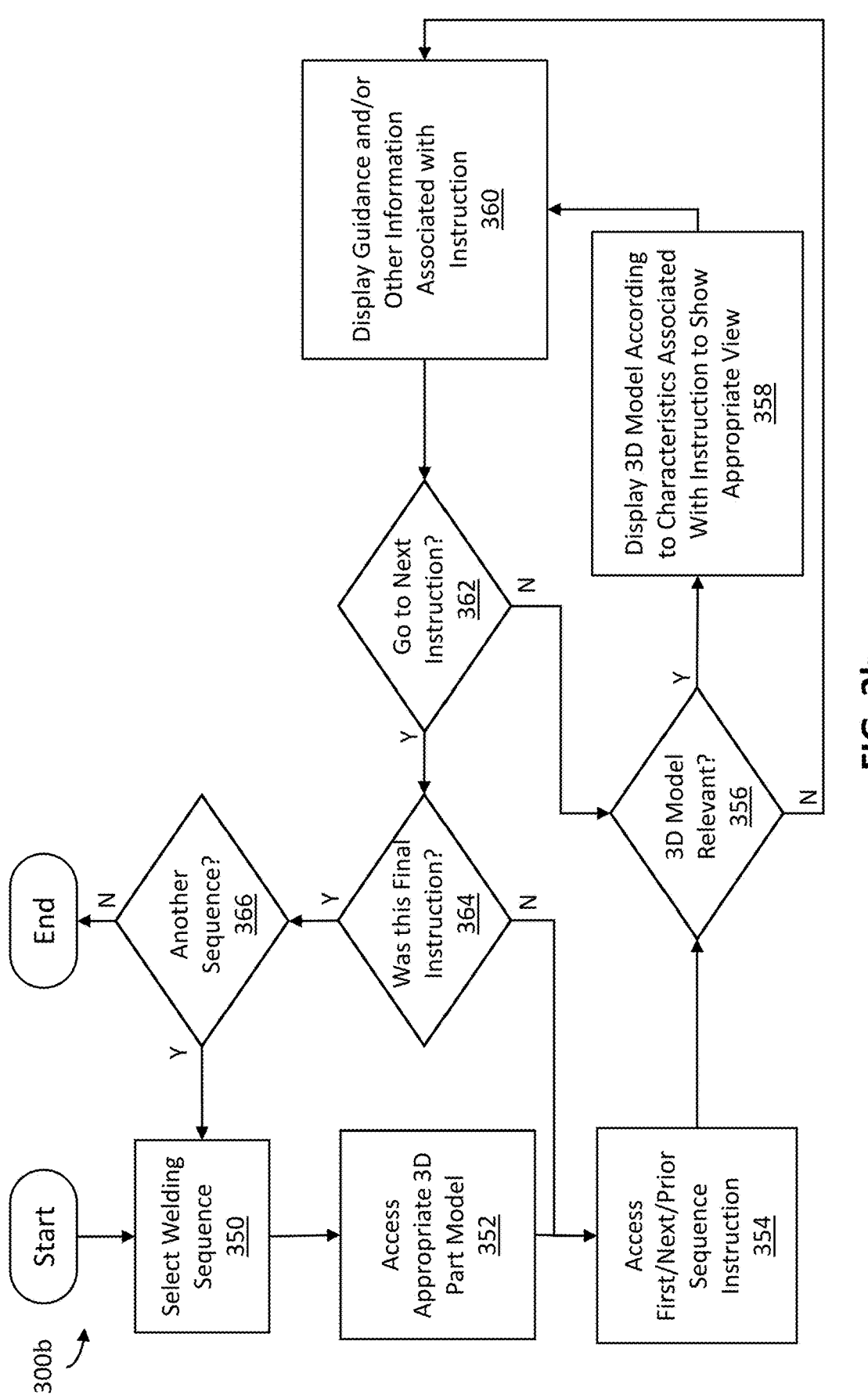
Figure 4A:
Figure 4B:
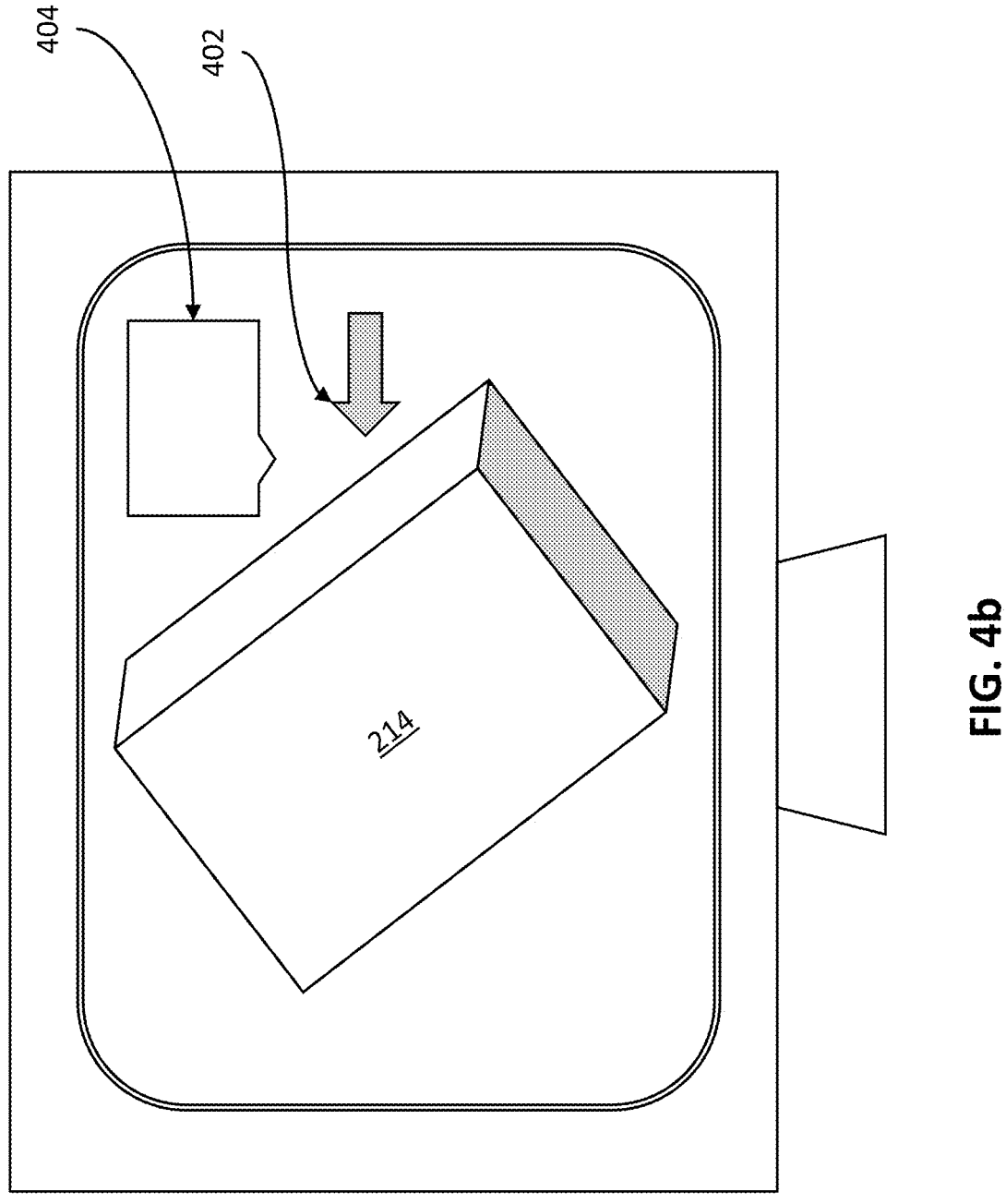
Figure 4C:

FIG. 3*b* is a flow diagram showing an example welding sequence execution process, in accordance with aspects of this disclosure FIGS. 4*a*-4*c* show different example perspective views of a 3D model that might be shown during a welding sequence progression, in accordance with aspects of this disclosure The figures are not necessarily to scale. Where appropriate, similar or identical reference numbers are used to refer to similar or identical components. For example, reference numerals utilizing lettering (e.g., welding sequence setup program 300*a*, welding sequence execution program 300*b*)

refer to instances of the same reference numeral that does not have the lettering (e.g., welding sequence program 300).

DETAILED DESCRIPTION

Conventional welding sequences use two dimensional (2D) images to guide operators. However, the welding sequences require significant time to acquire the 2D images and configure welding sequences with the 2D images. Each of these 2D images must be manually captured, which is a non-trivial task. Additionally, each image requires non-trivial storage space in memory. Further, the potential for reuse is limited. Additionally, it can be difficult for an operator to follow changes in perspective from one 2D image to another.

The example welding sequences disclosed herein uses three dimensional (3D) models, rather than 2D images, to guide operators. Since only one 3D model needs to be saved for each sequence, rather than potentially hundreds of 2D images, substantial memory space may be saved. Additionally, the same 3D model may be used for several welding sequences. Further, the 3D model may be animated to help the operator understand changes in perspective between steps of the welding sequence.

Some examples of the present disclosure relate to a system, comprising a display screen; a user interface; processing circuitry; and memory circuitry comprising a three dimensional model representative of a part, and machine readable instructions which, when executed by the processing circuitry, cause the processing circuitry to: generate a welding sequence comprising a plurality of welding sequence instructions relating to welding of a part, display, on the display screen, a first view of the three dimensional model, in response to receiving an input, via the user interface, identify the first view of the three dimensional model as relevant to a welding sequence instruction of the plurality of welding sequence instructions, associate one or more characteristics of the first view with the welding sequence instruction, and record the one or more characteristics of the first view and the association.

In some examples, the memory circuitry further comprises machine readable instructions which, when executed by the processing circuitry, cause the processing circuitry to: access the welding sequence instruction, in response to accessing the welding sequence instruction, access the one or more characteristics of the first view associated with the welding sequence instruction, and display the first view of the three dimensional image model on the display screen according to the one or more characteristics. In some examples, the memory circuitry further comprises machine readable instructions which, when executed by the processing circuitry, cause the processing circuitry to: in response to receiving a second input identifying a particular portion of the three dimensional model visible in the first view as relevant to the welding sequence instruction, associate the particular portion with the welding sequence instruction, and record the particular portion and the association. In some examples, the memory circuitry further comprises machine readable instructions which, when executed by the processing circuitry, cause the processing circuitry to: access the welding sequence instruction, in response to accessing the welding sequence instruction, access the one or more characteristics and the particular portion of the first view, display the first view of the three dimensional model on the display screen according to the one or more characteristics, and display guidance on the display screen that identifies as relevant the particular portion of the three dimensional model.

In some examples, the memory circuitry further comprises machine readable instructions which, when executed by the processing circuitry, cause the processing circuitry to: in response to receiving a second input, modify the one or more characteristics of the first view to display a second view of the three dimensional image model on the display screen, in response to receiving a third input identifying the second view as relevant to the welding sequence instruction, associate one or more modified characteristics of the second view with the welding sequence instruction, and record the one or more modified characteristics of the three dimensional model and the association with the welding sequence instruction. In some examples, the memory circuitry further comprises machine readable instructions which, when executed by the processing circuitry, cause the processing circuitry to: access the welding sequence instruction, in response to accessing the welding sequence instruction, access the one or more modified characteristics of the second view, and display the second view of the three dimensional model on the display screen according to the one or more modified characteristics. In some examples, the one or more characteristics comprise one or more of a size, height, zoom, focus, lighting, color, shadow, highlighting, hidden element, transparency, layering, or orientation of the three dimensional model.

Some examples of the present disclosure relate to a non-transitory machine readable medium having machine readable instructions which, when executed by a processor, cause the processor to: generate a welding sequence comprising a plurality of welding sequence instructions relating to welding of a part; display, on a display screen, a first view of a three dimensional model representative of the part; in response to receiving an input identifying the first view of the three dimensional model as relevant to a welding sequence instruction of the plurality of welding sequence instructions, associate one or more characteristics of the first view with the welding sequence instruction; and record the one or more characteristics of the first view and the association.

In some examples, the machine readable instructions, when executed by a processor, further cause the processor to: access the welding sequence instruction; in response to accessing the welding sequence instruction, access the one or more characteristics of the first view associated with the welding sequence instruction; and display the first view of the three dimensional model on the display screen according to the one or more characteristics. In some examples, the input comprises a first input, and the machine readable instructions, when executed by a processor, further cause the processor to: in response to receiving a second input identifying a particular portion of the three dimensional model visible in the first view as relevant to the welding sequence instruction, associate the particular portion with the welding sequence instruction; and record the particular portion and the association. In some examples, the machine readable instructions, when executed by a processor, further cause the processor to: access the welding sequence instruction; in response to accessing the welding sequence instruction, access the one or more characteristics and the particular portion of the first view; display the first view of the three dimensional model on the display screen according to the one or more characteristics; and display guidance on the display screen that identifies as relevant the particular portion of the three dimensional model.

In some examples, the input comprises a first input, and wherein the machine readable instructions, when executed by a processor, further cause the processor to: in response to receiving a second input, modify the one or more characteristics of the first view to display a second view of the three dimensional image model on the display screen; in response to receiving a third input identifying the second view as relevant to the welding sequence instruction, associate one or more modified characteristics of the second view with the welding sequence instruction; and record the one or more modified characteristics of the three dimensional model and the association with the welding sequence instruction. In some examples, the machine readable instructions, when executed by a processor, further cause the processor to: access the welding sequence instruction; in response to accessing the welding sequence instruction, access the one or more modified characteristics of the second view; and display the second view of the three dimensional model on the display screen according to the one or more modified characteristics. In some examples, the one or more characteristics comprise one or more of a size, height, zoom, focus, lighting, color, shadow, highlighting, hidden element, transparency, layering, or orientation of the three dimensional model.

Some examples of the present disclosure relate to a method, comprising generating, via processing circuitry, a welding sequence comprising a plurality of welding sequence instructions relating to welding of a part; displaying, on a display screen, a first view of a three dimensional model representative of the part; in response to receiving an input identifying the first view of the three dimensional model as relevant to a welding sequence instruction of the plurality of welding sequence instructions, associating one or more characteristics of the first view with the welding sequence instruction; and recording the one or more characteristics of the first view and the association.

In some examples, the method further comprises accessing the welding sequence instruction; in response to accessing the welding sequence instruction, accessing the one or more characteristics of the first view associated with the welding sequence instruction; and displaying the first view of the three dimensional image model on the display screen according to the one or more characteristics. In some examples, the method further comprises in response to receiving a second input identifying a particular portion of the three dimensional model visible in the first view as relevant to the welding sequence instruction, associating the particular portion with the welding sequence instruction; and recording the particular portion and the association. In some examples, the method further comprises accessing the welding sequence instruction; in response to accessing the welding sequence instruction, accessing the one or more characteristics and the particular portion of the first view; displaying the first view of the three dimensional model on the display screen according to the one or more characteristics; and displaying guidance on the display screen that identifies as relevant the particular portion of the three dimensional model.

In some examples, the method further comprises in response to receiving a second input, modifying the one or more characteristics of the first view to display a second view of the three dimensional image model on the display screen; in response to receiving a third input identifying the second view as relevant to the welding sequence instruction, associate one or more modified characteristics of the second view with the welding sequence instruction; and recording the one or more modified characteristics of the three dimensional model and the association with the welding sequence instruction. In some examples, the method further comprises accessing the welding sequence instruction; in response to accessing the welding sequence instruction, accessing the one or more modified characteristics of the second view; and displaying the second view of the three dimensional model on the display screen according to the one or more modified characteristics.

Figure 1:
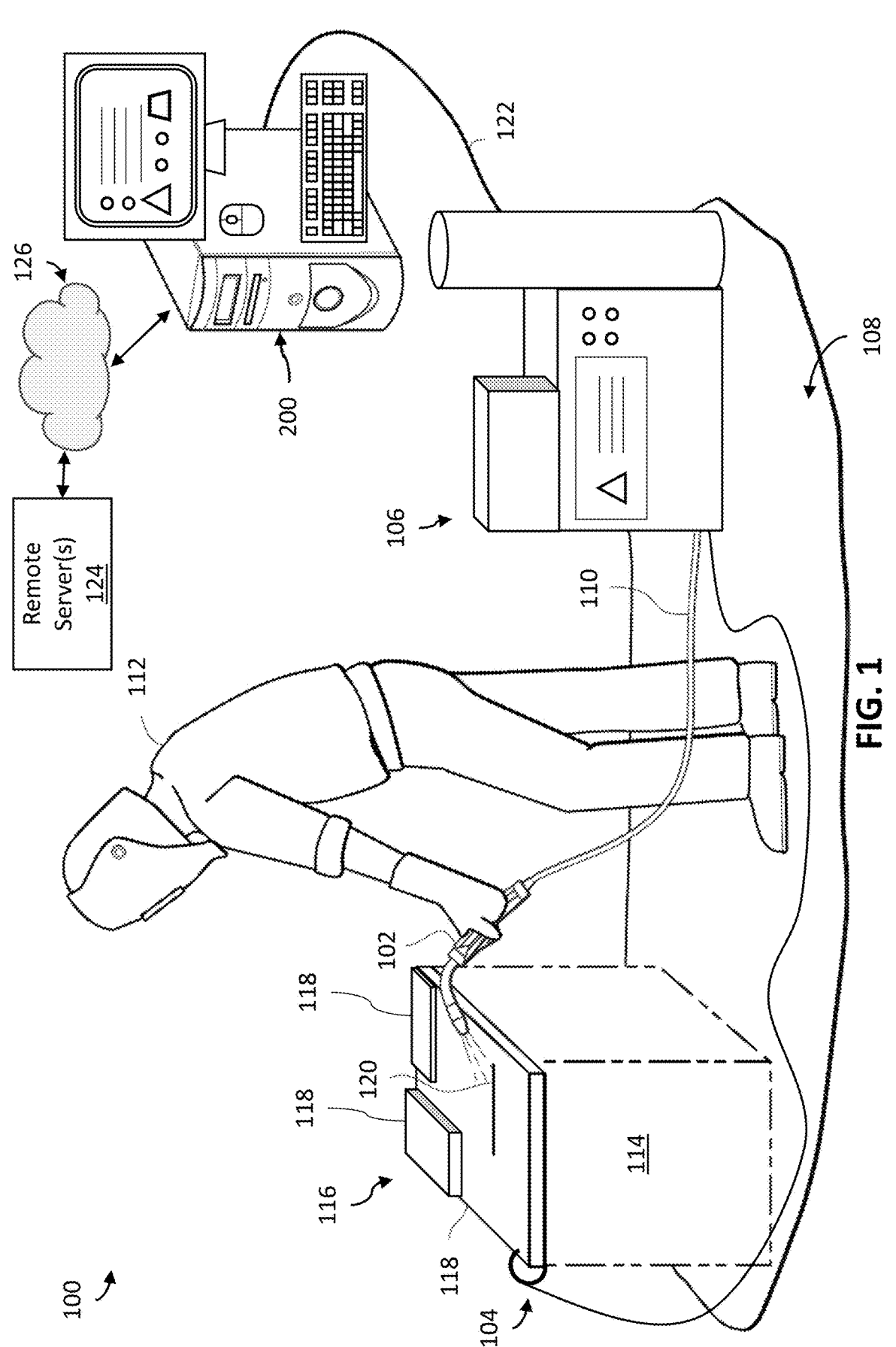
FIG. 1 shows an example welding system, in accordance with aspects of this disclosure.

FIG. 1 shows an example of a welding system 100. As shown, the welding system 100 includes a welding torch 102 and work clamp 104 coupled to a welding-type power supply 106 within a welding cell 108. The welding system 100 further includes a computing system 200 in communication with the welding-type power supply 106. In some examples, the computing system 200 may also be in communication with the welding torch 102 (e.g., via the welding-type power supply 106).

In the example of FIG. 1, the welding torch 102 is a gun configured for gas metal arc welding (GMAW). In some examples, the welding torch 102 may comprise some other welding device, such as, for example, an electrode holder (i.e., stinger) configured for shielded metal arc welding (SMAW), a torch and/or filler rod configured for gas tungsten arc welding (GTAW), a gun configured for flux-cored arc welding (FCAW), a filler rod, and/or some other appropriate device. As shown, the welding torch 102 is coupled to the welding-type power supply 106 via a welding cable 110. A clamp 104 is also coupled to the welding-type power supply 106 via a work cable.

In some examples, the welding-type power supply 106 may include power conversion circuitry configured to receive input power (e.g., from mains power, a generator, etc.) and convert the input power to welding-type power. In some examples, the welding-type power supply 106 may output welding-type power to the welding torch 102 via the welding cable 110. In some examples, the welding-type power supply 106 may additionally output welding wire and/or shielding gas to the welding torch 102 via the welding cable 110.

In the example of FIG. 1, a welding operator 112 is handling the welding torch 102 near a welding bench 114. As shown, a part 116 (aka welding assembly) is being welded on the welding bench 114. The part 116 includes several workpieces 118 that have been joined together via a welding arc. In the example of FIG. 1, the operator 112 is activating a trigger of the welding torch 102 to produce a welding arc that makes a weld 120 when applied to a workpiece 118. In some examples, when the operator 112 activates a trigger of the welding torch 102, the welding torch 102 may use the welding-type power (and/or welding wire and/or gas) provided by the welding-type power supply 106 to produce the welding arc. In some examples, the operator 112 may repeatedly apply a welding arc to one or more workpieces 118 in order to assemble the part 116.

In the example of FIG. 1, the welding-type power supply 106 is in communication with a computing system 200 via conduit 122. In some examples, the welding-type power supply 106 may be in wireless communication with computing system 200 (e.g., via wireless communication circuitry). In some examples, the welding torch 102 may additionally, or alternatively, be in direct communication with the computing system 200.

In the example of FIG. 1, the computing system 200 is in communication with one or more remote servers 124 via a network 126 (e.g., the internet, a wide area network (WAN), a local area network (LAN), etc.). In some examples, communication may occur via one or more wired media and/or protocols (e.g., Ethernet cable(s), universal serial bus cable(s), etc) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In some examples, the computing system 200 may assist the operator 112 in assembling the part 116. For example, the computing system 200 may provide a sequence of step by step instructions that guide the operator 112 through the assembly of the part 116. In some examples, the computing system 200 may use one or more 3D models to provide visual guidance of the welding assembly process for one or more steps.

Figure 2:
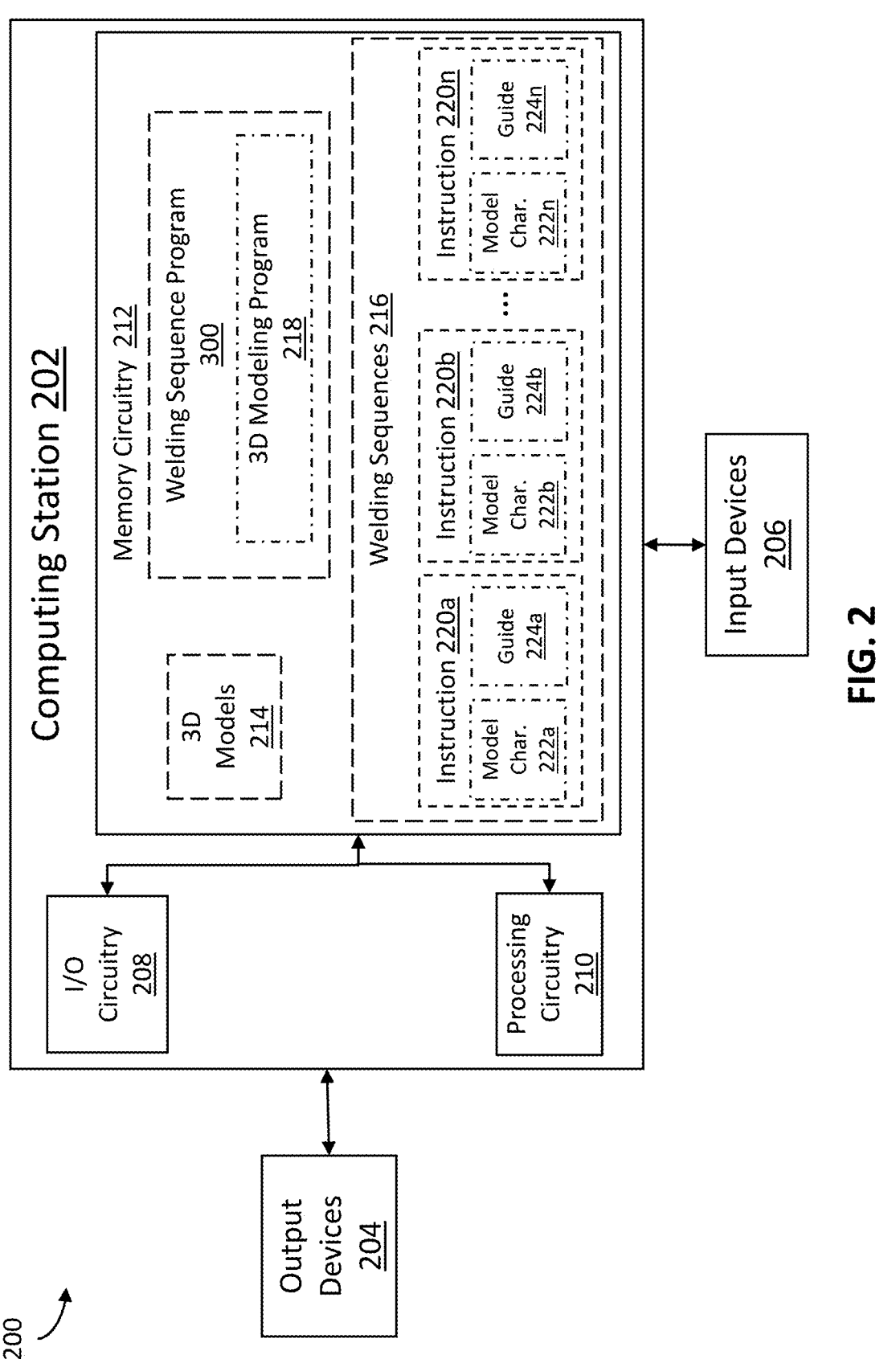
FIG. 2 is a block diagram showing example components and connections of computing system of the welding system of FIG. 1, in accordance with aspects of this disclosure.

FIG. 2 is a block diagram showing more details of the computing system 200. As shown, the computing system 200 includes a computing station 202 in communication with one or more output devices 204 and one or more input devices 206. In some examples, the output devices 204 may include one or more visual output devices (e.g., display screens), audio output devices (e.g., speakers), tactile output devices (e.g., vibrator(s) in the welding torch 102), and/or other appropriate output devices. In some examples, the input devices 206 may include one or more tactile input devices (e.g., keyboard(s), mouse, touch screen(s), remote control(s), buttons, knobs, etc.), audio input devices (e.g., microphone(s)), and/or other appropriate input devices. In some examples, the input devices 206 may additionally include the welding torch 102, welding-type power supply 106, and/or one or more sensors of the welding system 100.

In some examples, the computing station 202 may comprise a personal computer, such as a desktop or laptop, for example. In some examples, the computing station 202 may be a mobile device, such as, for example, a smartphone, personal digital assistant, portable music player, and/or tablet computer. In some examples, the computing station 202 may be implemented via the welding-type power supply 106 (e.g., via control circuitry of the welding-type power supply 106). In the example of FIG. 1, the computing station 202 includes input/output (I/O) circuitry 208, processing circuitry 210, and memory circuitry 212. As shown, the I/O circuitry 208, processing circuitry 210, and memory circuitry 212 are in electrical communication with one another through a common electrical bus.

In some examples, the I/O circuitry 208 may comprise communication circuitry for communicating over one or more wired and/or wireless mediums. In some examples, the communication circuitry may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry may be configured to facilitate communication via one or more wired protocols (e.g., Ethernet cable(s), universal serial bus cable(s), etc.) and/or wireless protocols (e.g., near field communication (NFC), ultra high frequency radio waves, IEEE 802.11x, Zigbee, HART, LTE, Z-Wave, WirelessHD, WiGig, etc.). In some examples, the I/O circuitry 208 may additionally comprise circuitry for interfacing with the various input devices 206 and/or output devices 204 coupled to and/or in communication with the computing station 200.

In some examples, the processing circuitry 210 comprises one or more processors that may be used to execute machine readable instructions stored in the memory circuitry 212. In some examples, the memory circuitry 212 stores machine readable instructions that drive some or all of the functions of the input devices 206 and/or output devices 204 coupled to and/or in communication with the computing station 202. In some examples, some or all of the data stored in the memory circuitry 212 of the computing station 202 may additionally, or alternatively, be stored in an external and/or remote memory (e.g., a remote server 124, an external hard drive, etc.).

In the example of FIG. 2, the memory circuitry 212 of the computing station 202 includes (and/or stores) a plurality of 3D models 214, a plurality of welding sequences 216, a 3D modeling program 218, and a welding sequence program 300. In the example of FIG. 2, the 3D modeling program 218 is part of the welding sequence program 300. In some examples, the 3D modeling program 218 may be separate from the welding sequence program 300. While shown as part of (and/or stored in) the memory circuitry 212 in the example of FIG. 2, in some examples, one or more of the 3D models 214, welding sequences 216, 3D modeling program 218, and/or welding sequence program 300 may be stored on a remote server 124.

In the example of FIG. 2, each welding sequence 216 includes a plurality of welding sequence instructions 220. However, in some examples, a welding sequence 216 may include only one instruction 220. As shown, each instruction 220 of the welding sequence 216 includes model characteristics 222 and guidance 224. In some examples, an instruction 220 may store additional information as well. In some examples, an instruction 220 may not include model characteristics 222 and/or guidance 224, or may include model characteristics 222 and/or guidance 224 with one or more null, undefined, and/or zero values.

In some examples, model characteristics 222 may define, describe, represent, and/or characterize a certain perspective view of a 3D model 214. In some examples, the model characteristics 222 may be representative of one or more angles of view, heights, zoom levels, focus attributes, lighting attributes, color attributes, shadow attributes, highlighting effects, hidden elements, transparency effects, layering attributes, and/or other appropriate properties, attributes, effects, and/or characteristics. In some examples, the sequence program 300 may present a model 214 to a welding operator 112 at a particular perspective view defined, described, represented, and/or characterized by the model characteristics 222 during execution of an instruction 220 of the welding sequence 216.

In some examples, guidance 224 may also be presented to a welding operator 112 during execution of an instruction 220 of the welding sequence 216. In some examples, the guidance 224 may comprise visual, audio, and/or tactile directions, notifications, effects, indicators, callouts, and/or other elements that might assist a welding operator 112 in understanding what task should be performed at a particular instructional stage of the welding sequence 216. For example, guidance 224 at a particular stage of a welding sequence 216 might include text explaining what task should be performed, an audio message cautioning against some common error, and/or a vibration sent to an output device 204 (e.g., the welding torch 102) to provide some notification. In some examples, guidance 224 may cooperate with the 3D model 214 to help provide direction to an operator 112. For example, the guidance 224 may indicate to the sequence program 300 that a particular portion of the 3D model 214 should be highlighted, colored, made transparent, encircled, pointed to, and/or otherwise emphasized.

In some examples, a 3D model 214 may comprise a collection of data interpretable by the 3D modeling program

218 and/or welding sequence program 300 to present a visual representation of a part 116. In some examples, a 3D model 214 may be comprised of several other 3D models 214 representative of workpieces 118, subparts, subassemblies, and/or other parts 116. In some examples, the model characteristics 222 may define, describe, represent, and/or characterize the relationship between the different workpieces 118, subparts, subassemblies, and/or other parts 116 that make up the 3D model 214. For example, the model characteristics 222 may describe distances, angles, connections, and/or other relationships between different workpieces 118, subparts, subassemblies, and/or other parts 116 of the 3D model 214. In some examples, a 3D model 214 may be displayed to a welding operator 112 by the modeling program 218 and/or welding sequence program 300 through one or more output devices 204 of the computing system 200. In some examples, the 3D modeling program 218 may be executed and/or controlled by the welding sequence program 300.

FIGS. 3a and 3b are flow diagrams illustrating steps of an example welding sequence program 300. In some examples, the welding sequence program 300 may be implemented in non-transitory machine readable (and/or processor executable) instructions stored in memory circuitry 212 of the computing station 202 and/or executed by the processing circuitry 210. In some examples, the welding sequence program 300 may guide a welding operator 112 through a welding process via execution of one or more welding sequences 216.

In some examples, the welding sequence program 300 may include a setup program 300a and/or an execution program 300b. In some examples, the welding sequence setup program 300a may coordinate setup and/or configuration of one or more welding sequences 216 (e.g., by an administrator or technician). In some examples, the welding sequence execution program 300b may execute one or more previously setup and/or configured welding sequences 216 to guide an operator 112 through steps of a welding process.

FIG. 3a illustrates an example welding sequence setup program 300a. In the example of FIG. 3a, the welding sequence setup program 300a begins at block 302. At block 302, the welding sequence setup program 300a selects one or more properties of a new welding sequence 216 to setup and/or configure, or an existing welding sequence 216 to modify and/or reconfigure. In some examples, the welding sequence setup program 300a may make the one or more property selections in response to, and/or based on, user input (e.g., via one or more of the input devices 206). In some examples, the properties may comprise one or more of a name of the welding sequence 216, an identifier (e.g., alphanumeric) of the welding sequence 216, a name of a part 116 (e.g., produced via the welding sequence 216), an identifier of the part 116, a name or identifier of a 3D model 214, a name or identifier of a welding process, a job or project name or identifier, a client name or identifier, a date, a name or identifier of an operator 112, and/or other appropriate properties.

In the example of FIG. 3a, the welding sequence setup program 300a proceeds to block 304 after block 302. At block 304, the welding sequence setup program 300a uses one or more of the properties selected at block 304 to access and/or display (e.g., via one or more output devices 204) the appropriate 3D model 214. In some examples, the welding sequence setup program 300a may execute the 3D modeling program 218 to display the 3D model 214.

In the example of FIG. 3a, the welding sequence setup program 300a proceeds to block 306 after block 304. At block 306, the welding sequence setup program 300a selects to add a new welding sequence instruction 220, modify an existing welding sequence instruction 220, or delete an existing welding sequence instruction 220. In some examples, the welding sequence setup program 300a may make this selection in response to, and/or based on, user input. In some examples, welding sequence setup program 300a may delete an existing welding sequence instruction 220 as part of the modification of the existing welding sequence instruction 220. In some examples, the welding sequence setup program 300a may proceed to block 314 or 318 after block 306 when deleting an instruction 220.

In the example of FIG. 3a, the welding sequence setup program 300a proceeds to block 308 after block 306. At block 308, the welding sequence setup program 300a determines whether the 3D model 214 associated with the welding sequence 216 is relevant for this instruction 220. In some examples, a welding sequence instruction may not need to use the 3D model 214. For example, the instruction 220 may be to clean the welding torch 102, replace a nozzle or tip of the welding torch 102, change a parameter on the welding-type power supply 106, watch a training video, and/or perform some other task that can be adequately described without the 3D model 214. In some examples, the welding sequence setup program 300a may record the relevance of the 3D model 214 as part of the instruction 220. As shown, the welding sequence setup program 300a proceeds to block 312 if the 3D model 214 is not relevant to the present instruction 220.

In the example of FIG. 3, the welding sequence setup program 300a proceeds to block 310 after block 308 if the 3D model 214 is relevant to the present instruction 220. At block 310, the welding sequence setup program 300a manipulates the 3D model 214 (e.g., via the 3D modeling program 218) to present a desired perspective view of the 3D model 214 to the user (e.g., via one or more output devices 204). In some examples, the welding sequence setup program 300a may manipulate the 3D model 214 in response to, and/or based on, one or more inputs from the user (e.g., received via one or more input devices 206). In some examples, the welding sequence setup program 300a may record one or more model characteristics 222 representative of the manipulation and/or the resulting perspective view. In some examples, the perspective view of the 3D model 214 that results from the manipulation may be a view that prominently shows a welding location (or other pertinent location) that will be involved in the current sequence instruction.

In the example of FIG. 3a, the welding sequence setup program 300a proceeds to block 312 after block 310 (and/or after block 308 if the 3D model 214 is not relevant to the current instruction 220). At block 312, the welding sequence setup program 300a adds guidance 224, if appropriate. In some examples, the welding sequence setup program 300a may add guidance 224 in response to, and/or based on, one or more inputs from the user. In some examples, the guidance 224 may provide direction as to what task to undertake during that particular stage of the welding sequence 216. In some examples, the guidance 224 may relate to the 3D model 214, the particular perspective view of the 3D model 214, and/or a particularly relevant location on the 3D model 214. In some examples, the guidance 224 may comprise a 2D image snapshot of the perspective view of the 3D model 214. In some examples, a user may also add additional information to the instruction 220 at block 312 of the welding sequence setup program 300a. For example, the user may add information regarding requirements the welding sequence program 300 may use to determine whether to move to the next instruction 220 (e.g., manual user selection, received signal(s) from torch 102 and/or sensor(s)).

In the example of FIG. 3a, the welding sequence setup program 300a proceeds to block 314 after block 312. At block 314, the welding sequence setup program 300a determines whether the current sequence instruction 220 is finished. In some examples, this determination may be based on input received from a user (e.g., via the input device(s) 206). For example, the user may make a selection and/or entry representative of the instruction 220 being finished or not finished. As shown, the welding sequence setup program 300a returns to block 308 after block 314 if the welding sequence setup program 300a determines the instruction 220 is not finished.

In the example of FIG. 3a, the welding sequence setup program 300a proceeds to block 316 after block 314 if the welding sequence setup program 300a determines that the instruction 220 is finished. At block 316, the welding sequence setup program 300a associates the guidance 224, model characteristics 222, and any other pertinent information with the instruction 220, and saves the instruction 220 and association in memory circuitry 212. In some examples, the guidance 224, model characteristics 222, and/or other pertinent information may be saved in memory circuitry 212 separate from the instruction 220. In some examples, the association may comprise one or more pointers and/or references to those location(s) in memory circuitry 212 that is saved with the instruction. In some examples, the guidance 224, model characteristics 222, and/or other pertinent information may be saved in memory circuitry 212 with (and/or as part of) the instruction 220, in which case the association may be more direct.

In the example of FIG. 3a, the welding sequence setup program 300a proceeds to block 318 after block 316. At block 318, the welding sequence setup program 300a determines whether the welding sequence 216 is finished. In some examples, this determination may be based on input received from a user (e.g., via the input device(s) 206). For example, the user may make a selection and/or entry representative of the sequence 216 being finished or not finished. In some examples, the welding sequence setup program 300a may allow the user to review the welding sequence 216 prior to selecting whether the sequence 216 is finished. In some examples, the 3D modeling program 218 may animate a transition of the 3D model 214 between perspective views of the welding sequence 216 during the review, to illustrate changes in perspective. As shown, the welding sequence setup program 300a returns to block 306 after block 318 if the welding sequence setup program 300a determines the sequence 216 is not finished.

In the example of FIG. 3a, the welding sequence setup program 300a proceeds to block 320 after block 318 if the welding sequence setup program 300a determines that the current welding sequence 216 is finished. At block 320, the welding sequence setup program 300a determines whether all the welding sequences 216 are finished being setup, or if additional welding sequences 216 need to be setup. In some examples, this determination may be based on input received from a user (e.g., via the input device(s) 206). For example, the user may make a selection and/or entry representative of the welding sequences 216 being finished or not finished. As shown, the welding sequence setup program 300a returns to block 302 after block 320 if the welding sequence setup program 300a determines that more welding sequences 216 need to be setup. However, if the welding sequence setup program 300a determines that no more welding sequences 216 need to be setup, the welding sequence setup program 300*a* ends after block 320.

FIG. 3*b* illustrates an example welding sequence execution program 300*b*. In the example of FIG. 3*b*, the welding sequence execution program 300*b* begins at block 350. At block 350, the welding sequence execution program 300*b* selects the appropriate welding sequence 216 for execution. In some examples, the welding sequence execution program 300*b* may make this selection in response to, and/or based on, user input (e.g., received via input device(s) 206). For example, the welding sequence execution program 300*b* may select the appropriate welding sequence 216 based on user entry of one or more of the properties referenced above with respect to block 302 of FIG. 3*a*.

In the example of FIG. 3*b*, the welding sequence execution program 300*b* proceeds to block 352 after block 350. At block 352, the welding sequence execution program 300*b* accesses the 3D model 214 that is associated with the selected welding sequence 216. In some examples, the 3D model 214 may be stored with, and/or referenced by, the welding sequence 216.

In the example of FIG. 3*b*, the welding sequence execution program 300*b* proceeds to block 354 after block 352. At block 354, the welding sequence execution program 300*b* accesses the first, next, or prior welding sequence instruction 220 of the selected welding sequence 216. In some examples, the selected welding sequence 216 may include a reference and/or association with at least the first sequence instruction 220, and the welding sequence execution program 300*b* may access the first instruction 220 of a welding sequence 216 using the reference and/or association. In some examples, each instruction 220 may include a reference and/or association with the next and/or prior instruction 220 (or a null, 0, or undefined value if such a next/prior instruction does not exist). Thereby, the welding sequence execution program 300*b* may access the next/prior instruction 220 of the welding sequence 216 using this reference and/or association. In some examples, the welding sequence 216 may include a reference and/or association with each instruction 220.

In the example of FIG. 3*b*, the welding sequence execution program 300*b* may proceed to block 356 after block 354. At block 356, the welding sequence execution program 300*b* determines whether the 3D model 214 is relevant to the instruction 220. In some examples, this determination may involve accessing the relevance recorded at block 308 of the welding sequence setup program 300*a*. As shown, the welding sequence execution program 300*b* proceeds to block 360 if the 3D model 214 is not relevant to the present instruction 220.

In the example of FIG. 3*b*, the welding sequence execution program 300*b* proceeds to block 358 after block 356 if the 3D model 214 is relevant to the current instruction 220. At block 358, the welding sequence execution program 300*b* accesses the model characteristics 222 associated with the instruction 220 and displays the 3D model 214 at the perspective view defined and/or represented by the model characteristics 222 (e.g., via the output device(s) 204). In some examples, the welding sequence execution program 300*b* may use the 3D modeling program 218 to display the 3D model 214. In some examples, where the perspective view is different than a prior perspective view displayed, the 3D modeling program 218 may animate a transition of the 3D model 214 between the prior and current perspective views, so as to help the welding operator 112 understand the change in perspective.

In the example of FIG. 3*b*, the welding sequence execution program 300*b* proceeds to block 360 after block 358 (or after block 356 if the welding sequence execution program 300*b* determines that the 3D model 214 is not relevant). At block 360, the welding sequence execution program 300*b* outputs guidance 224 associated with the current welding sequence instruction 220, if there is any. In some examples, the welding sequence execution program 300*b* may also output additional information associated with the welding sequence instruction 220.

In the example of FIG. 3*b*, the welding sequence execution program 300*b* proceeds to block 362 after block 360. At block 362, the welding sequence execution program 300*b* determines whether to iterate to the next (or previous) instruction 220 in the welding sequence 216. In some examples, the welding sequence execution program 300*b* may determine whether to iterate to the next instruction based on information associated with the instruction 220, and/or one or more manual or automatic inputs received via input device(s) 206. For example, a user may make a manual selection and/or indication to iterate to the next instruction 220 (or prior instruction 220). As another example, the welding sequence execution program 300*b* may receive one or more signals from input device(s) 206 and determine to iterate to the next instruction 220 based on the received signal(s). For example, the welding sequence execution program 300*b* may receive one or more signals from the welding torch 102 representative of a trigger pull or trigger release, and determine to iterate based on the signal(s). As another example, the welding sequence execution program 300*b* may receive one or more signals from a sensor that reads some information indicative of a certain event (e.g., wire spool change, loading of workpiece 118), and determine to iterate based on the signal(s). If the welding sequence execution program 300*b* determines not to iterate to the next instruction 220, the welding sequence execution program 300*b* returns to block 356.

In the example of FIG. 3*b*, the welding sequence execution program 300*b* proceeds to block 364 after block 362 if the welding sequence execution program 300*b* decides to iterate to the next instruction 220. At block 364, the welding sequence execution program 300*b* determines whether the current instruction 220 is the final instruction 220 in the welding sequence, using the previously discussed references to next/prior instructions 220 within each instruction 220. If the welding sequence execution program 300*b* determines that the current instruction 220 is not the final instruction 220, the welding sequence execution program 300*b* returns to block 354.

In the example of FIG. 3*b*, the welding sequence execution program 300*b* proceeds to block 366 after block 364 if the welding sequence execution program 300*b* determines that the current instruction is the final instruction 220. At block 366, the welding sequence execution program 300*b* ends the current welding sequence 216 and determines whether another welding sequence 216 should be started (e.g., based on input from input device(s) 206). If the welding sequence execution program 300*b* determines that another welding sequence 216 should be started, the welding sequence execution program 300*b* returns to block 350. If not, the welding sequence execution program 300*b* ends.

FIGS. 4*a*-4*c* show examples of perspective views of a 3D model 214 that might be presented to a user via a display screen 400 during different instructions 220 of a welding sequence 216 (either during setup or execution). FIG. 4*a* shows an initial view of the 3D model 214, such as might be defined and/or represented by initial model characteristics 222. As shown, no guidance 224 is presented along with the 3D model 214.

FIG. 4*b* illustrates another view of the 3D model 214, such as might be shown during a subsequent instruction 220 associated with different model characteristics 222. As shown, the 3D model 214 is both larger and rotated from the perspective view of FIG. 4*a*, indicating a change in at least angle and zoom. Additionally, guidance 224 in the form of an arrow 402 and a text callout 404 are shown with the 3D model 214.

FIG. 4*c* shows a third view of the 3D model 214, such as might be shown during a third instruction 220 associated with third model characteristics 222. As shown, the 3D model is smaller than in both FIGS. 4*a* and 4*b*, but at approximately the same orientation as FIG. 4*b*. In some examples, this may indicate a change in zoom and not angle. The guidance 224 has also been removed. While difficult to show in the figures, in some examples, the 3D model 214 may be animated when transitioning between the different perspective views to assist the welding operator 112 in understanding how the view has changed.

The example welding sequences 216 disclosed herein use 3D models 214, rather than 2D images, to guide operators through welding sequences 216. Since only one 3D model is needed for each sequence 216, rather than potentially hundreds of 2D images, substantial memory space may be saved. Additionally, the same 3D model 214 may be used for several welding sequences 216. Further, the 3D model 214 may be animated to help the operator 112 understand changes in perspective between steps of the welding sequence 216.

The present methods and systems may be realized in hardware, software, and/or a combination of hardware and software. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. For example, blocks and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "approximate" and/or "approximately," when used to modify or describe a value (or range of values), position, shape, orientation, and/or action, mean reasonably close to that value, range of values, position, shape, orientation, and/or action. Thus, the examples described herein are not limited to only the recited values, ranges of values, positions, shapes, orientations, and/or actions but rather should include reasonably workable deviations.

As utilized herein, the terms "e.g.," and "for example" set off lists of one or more non-limiting examples, instances, or illustrations.

As used herein, the terms "couple," "coupled," "attach," "attached," "connect," and/or "connected" refer to a structural and/or electrical affixing, joining, fasten, linking, and/or other securing.

As utilized herein the terms "circuits" and "circuitry" refer to physical electronic components (i.e. hardware) and/or any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, circuitry is "configured" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switchmode power supplies, etc., as well as control circuitry and other ancillary circuitry associated therewith.

As used herein, a welding-type tool refers to any tool capable of performing a welding, cladding, brazing, plasma cutting, induction heating, carbon arc cutting or gouging and/or resistive preheating operation.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A non-transitory machine readable medium comprising a three dimensional model representative of a part, and machine readable instructions which, when executed by a processor, cause the processor to:

generate a welding sequence comprising a plurality of welding sequence instructions relating to welding of the part;

display, on a display screen, a first view of the three dimensional model; and in response to receiving, via a user interface, an association input identifying the first view of the three dimensional model as relevant to a welding sequence instruction of the plurality of welding sequence instructions, record (i) the welding sequence instruction, (ii) one or more first view characteristics of the first view, and (iii) an association between the welding sequence instruction and the one or more first view characteristics.

2. The non-transitory machine readable medium of claim 1, further comprising machine readable instructions which, when executed by a processor, cause the processor to:

display, on the display screen, an initial view of the three dimensional model; and in response to receiving a manipulation input via the user interface, manipulate the three dimensional model such that the display screen displays the first view of the three dimensional model instead of the initial view of the three dimensional model, the first view of the three dimensional model being different from the initial view of the three dimensional model with respect to at least one or more first view perspective characteristics, and the one or more first view characteristics comprising the one or more first view perspective characteristics.

3. The non-transitory machine readable medium of claim 2, wherein the one or more first view perspective characteristics comprise one or more of a size, height, zoom, focus, or orientation of the three dimensional model.

4. The non-transitory machine readable medium of claim 1, further comprising machine readable instructions which, when executed by a processor, cause the processor to:

in response to receiving, via the user interface, a guidance input identifying a particular portion of the three dimensional model visible in the first view as particularly relevant to the welding sequence instruction, manipulate the three dimensional model such that the display screen displays an emphasized first view of the three dimensional model instead of the first view of the three dimensional model, the emphasized first view of the three dimensional model being the same as the first view of the three dimensional model except at the particular portion, the emphasized first view of the three dimensional model being different from the first view of the three dimensional model at the particular portion with respect to one or more emphasis characteristics, the association input identifying the emphasized first view of the three dimensional model as relevant to the welding sequence instruction, and the one or more first view characteristics comprising the one or more emphasis characteristics, and in response to receiving the association input via the user interface, record the particular portion and an additional association between the welding sequence instruction and the particular portion.

5. The non-transitory machine readable medium of claim 1, further comprising machine readable instructions which, when executed by a processor, cause the processor to:

access the welding sequence instruction of the welding sequence;

identify the one or more first view characteristics of the first view based on the association between the welding sequence instruction and the one or more first view characteristics of the first view; and reproduce the first view of the three dimensional model on the display screen using the three dimensional model and the one or more first view characteristics.

6. The non-transitory machine readable medium of claim 5, further comprising machine readable instructions which, when executed by a processor, cause the processor to:

determine whether to iterate to a next welding sequence instruction of the plurality of welding sequence instructions; and in response to determining to iterate to the next welding sequence instruction:

identify the next welding sequence instruction, identify one or more second view characteristics based on a recorded association between the next welding sequence instruction and the one or more second view characteristics, and display, on the display screen, an animated transition of the three dimensional model from the first view of the three dimensional model to the second view of the three dimensional model.

7. The non-transitory machine readable medium of claim 6, wherein a determination of whether to iterate instructions is based on an input received from an input device and (i) the content of the welding sequence instruction or (ii) iteration data associated with the welding sequence instruction.

8. A system, comprising:
a display screen;
a user interface;
processing circuitry; and
memory circuitry comprising:
a three dimensional model representative of a part, and
machine readable instructions which, when executed by the processing circuitry, cause the processing circuitry to:
generate a welding sequence comprising a plurality of welding sequence instructions relating to welding of the part,
display, on the display screen, a first view of the three dimensional model,
in response to receiving, via the user interface, an association input identifying the first view of the three dimensional model as relevant to a welding sequence instruction of the plurality of welding sequence instructions, record (i) the welding sequence instruction, (ii) one or more first view characteristics of the first view, and (iii) an association between the welding sequence instruction and the one or more first view characteristics.

9. The system of claim 8, wherein the memory circuitry comprises machine readable instructions which, when executed by the processing circuitry, further causes the processing circuitry to:
display, on the display screen, an initial view of the three dimensional model, and
in response to receiving a manipulation input via the user interface, manipulate the three dimensional model such that the display screen displays the first view of the three dimensional model instead of the initial view of the three dimensional model,
the first view of the three dimensional model being different from the initial view of the three dimensional model with respect to at least one or more first view perspective characteristics, and
the one or more first view characteristics comprising the one or more first view perspective characteristics.

10. The system of claim 9, wherein the one or more first view perspective characteristics comprise one or more of a size, height, zoom, focus, or orientation of the three dimensional model.

11. The system of claim 8, wherein the memory circuitry comprises machine readable instructions which, when executed by the processing circuitry, further causes the processing circuitry to:
in response to receiving, via the user interface, a guidance input identifying a particular portion of the three dimensional model visible in the first view as particularly relevant to the welding sequence instruction, manipulate the three dimensional model such that the display screen displays an emphasized first view of the three dimensional model instead of the first view of the three dimensional model,
the emphasized first view of the three dimensional model being the same as the first view of the three dimensional model except at the particular portion, the emphasized first view of the three dimensional model being different from the first view of the three dimensional model at the particular portion with respect to one or more emphasis characteristics,
the association input identifying the emphasized first view of the three dimensional model as relevant to the welding sequence instruction, and the one or more first view characteristics comprising the one or more emphasis characteristics, and
in response to receiving the association input via the user interface, record the particular portion and an additional association between the welding sequence instruction and the particular portion.

12. The system of claim 8, wherein the memory circuitry comprises machine readable instructions which, when executed by the processing circuitry, further causes the processing circuitry to:
access the welding sequence instruction of the welding sequence,
identify the one or more first view characteristics of the first view based on the association between the welding sequence instruction and the one or more first view characteristics of the first view, and
reproduce the first view of the three dimensional model on the display screen using the three dimensional model and the one or more first view characteristics.

13. The system of claim 12, wherein the memory circuitry comprises machine readable instructions which, when executed by the processing circuitry, further causes the processing circuitry to:
determine whether to iterate to a next welding sequence instruction of the plurality of welding sequence instructions, and
in response to determining to iterate to the next welding sequence instruction:
identify the next welding sequence instruction,
identify one or more second view characteristics based on a recorded association between the next welding sequence instruction and the one or more second view characteristics, and
display, on the display screen, an animated transition of the three dimensional model from the first view of the three dimensional model to the second view of the three dimensional model.

14. The system of claim 13, wherein a determination of whether to iterate instructions is based on an input received from an input device and (i) the content of the welding sequence instruction or (ii) iteration data associated with the welding sequence instruction.

15. A method, comprising:
generating, via processing circuitry, a welding sequence comprising a plurality of welding sequence instructions relating to welding of a part;
displaying, on a display screen, a first view of a three dimensional model representative of the part, the three dimensional model being stored in memory circuitry;
receiving, via a user interface, an association input identifying the first view of the three dimensional model as relevant to a welding sequence instruction of the plurality of welding sequence instructions; and
in response to receiving the association input, recording in the memory circuitry: (i) the welding sequence instruction, (ii) one or more first view characteristics of the first view, and (iii) an association between the welding sequence instruction and the one or more first view characteristics.

16. The method of claim 15, further comprising:

displaying, on the display screen, an initial view of the three dimensional model;

receiving a manipulation input via the user interface; and in response to receiving the manipulation input, manipulate the three dimensional model, via the processing circuitry, such that the display screen displays the first view of the three dimensional model instead of the initial view of the three dimensional model, the first view of the three dimensional model being different from the initial view of the three dimensional model with respect to at least one or more first view perspective characteristics, and the one or more first view characteristics comprising the one or more first view perspective characteristics.

17. The method of claim 15, further comprising:

receiving, via the user interface, a guidance input identifying a particular portion of the three dimensional model visible in the first view as particularly relevant to the welding sequence instruction;

in response to receiving the guidance input, manipulating the three dimensional model, via the processing circuitry, such that the display screen displays an emphasized first view of the three dimensional model instead of the first view of the three dimensional model, the emphasized first view of the three dimensional model being the same as the first view of the three dimensional model except at the particular portion, the emphasized first view of the three dimensional model being different from the first view of the three dimensional model at the particular portion with respect to one or more emphasis characteristics, the association input identifying the emphasized first view of the three dimensional model as relevant to the welding sequence instruction, and the one or more first view characteristics comprising the one or more emphasis characteristics; and in response to receiving the association input, recording in the memory circuitry the particular portion and an additional association between the welding sequence instruction and the particular portion.

18. The method of claim 15, further comprising:

accessing the welding sequence instruction of the welding sequence via the processing circuitry;

identifying the one or more first view characteristics of the first view, via the processing circuitry, based on the association between the welding sequence instruction and the one or more first view characteristics of the first view; and reproducing the first view of the three dimensional model on the display screen, via the processing circuitry, using the three dimensional model and the one or more first view characteristics.

19. The method of claim 18, determining, via the processing circuitry, whether to iterate to a next welding sequence instruction of the plurality of welding sequence instructions; and in response to determining to iterate to the next welding sequence instruction:

identifying the next welding sequence instruction via the processing circuitry, identifying, via the processing circuitry, one or more second view characteristics based on a recorded association between the next welding sequence instruction and the one or more second view characteristics, and displaying, on the display screen, an animated transition of the three dimensional model from the first view of the three dimensional model to the second view of the three dimensional model.

20. The method of claim 19, wherein the determining of whether to iterate instructions is based on an input received from an input device and (i) the content of the welding sequence instruction or (ii) iteration data associated with the welding sequence instruction.

* * * * *